US009547719B2

(12) United States Patent
Ivershen et al.

(10) Patent No.: US 9,547,719 B2
(45) Date of Patent: Jan. 17, 2017

(54) BANDWIDTH EFFICIENT PROCESSING AND FILTERING ACROSS DISTRIBUTED DATABASES

(71) Applicant: Tektronix, Inc., Beaverton, OR (US)

(72) Inventors: Aleksey G. Ivershen; Sai K. Rupanagudi, Dallas, TX (US)

(73) Assignee: Netscout Systems Texas, LLC, Plano, TX (US)

( * ) Notice: Subject to any disclaimer, the term of this patent is extended or adjusted under 35 U.S.C. 154(b) by 357 days.

(21) Appl. No.: 14/296,229

(22) Filed: Jun. 4, 2014

(65) Prior Publication Data

US 2015/0356182 A1 Dec. 10, 2015

(51) Int. Cl.
| | |
|---|---|
| *G06F 7/02* | (2006.01) |
| *G06F 17/30* | (2006.01) |
| *H04L 29/08* | (2006.01) |
| *H04L 12/26* | (2006.01) |
| *H04L 12/24* | (2006.01) |

(52) U.S. Cl.
CPC ... *G06F 17/30867* (2013.01); *G06F 17/30283* (2013.01); *H04L 43/028* (2013.01); *H04L 43/08* (2013.01); *H04L 67/1095* (2013.01); *H04L 41/507* (2013.01); *H04L 43/0805* (2013.01); *H04L 43/0829* (2013.01); *H04L 43/0852* (2013.01); *H04L 43/0888* (2013.01)

(58) Field of Classification Search
None
See application file for complete search history.

(56) References Cited

U.S. PATENT DOCUMENTS

| | | | |
|---|---|---|---|
| 2013/0117842 A1 | 5/2013 | Kakadia et al. | |
| 2013/0182700 A1 | 7/2013 | Figura et al. | |
| 2013/0198368 A1* | 8/2013 | Patterson | H04L 67/101 709/224 |
| 2014/0052847 A1* | 2/2014 | Jadallah | H04L 43/0876 709/224 |
| 2014/0099938 A1 | 4/2014 | Calo et al. | |
| 2015/0149611 A1* | 5/2015 | Lissack | H04L 43/0817 709/224 |

OTHER PUBLICATIONS

Extended European Search Report for European Application No. 15170589.4, dated Oct. 29, 2015.

* cited by examiner

*Primary Examiner* — Bruce Moser
(74) *Attorney, Agent, or Firm* — Locke Lord LLP; Scott D. Wofsy; Christopher J. Capelli (57) ABSTRACT

A central node sends a query indicating at least one key performance indicator (KPI) and a first KPI filter criterion to one or more edge nodes causing each edge node to cache subscriber data from each subscriber having a KPI value corresponding to the KPI. The central node receives subscriber data, responsive to the query, and aggregates the subscriber data according to each subscriber and the corresponding KPI value to yield an aggregated initial subscriber dataset and sends a subsequent query to each edge node that (for each edge node) indicates a subscriber from the initial subscriber dataset not returned by the edge node. The central node receives subsequent subscriber, responsive to the subsequent query, and aggregates the subsequent subscriber data with the initial subscriber dataset to yield a final subscriber dataset that indicates a total KPI value for each subscriber.

14 Claims, 6 Drawing Sheets

BANDWIDTH EFFICIENT PROCESSING AND FILTERING ACROSS DISTRIBUTED DATABASES

BACKGROUND

1. Field of the Invention

The present disclosure relates to bandwidth efficient processing and filtering, and more particularly, to bandwidth efficient processing and filtering across distributed databases (e.g., as between central nodes and edge nodes).

2. Description of the Related Art

Communication technologies are transforming the global media services industry. For example, modern communication technologies provide IP-based services that are integrated with more traditional services (e.g., telecommunications). As the communication technologies evolve, an increasing number of applications and services are being made available over these communication networks. Content, application, and/or service providers use hardware and/or software to provide access to data and/or electronic resources for users (e.g., subscribers) and, increasingly, use a distributed network approach. With this distributed network approach, monitoring network resources, including bandwidth parameters, hardware performance, network congestion, quality of user experience, etc., is important to maintain network integrity as well as to ensure proper quality of service for end-users. Network performance indicators to measure the performance of the network are generally referred to as Key Performance Indicators (KPI). There are currently many tools and techniques to measure various KPIs (e.g., for one or more particular dimensions), however, such techniques tend to be overly complex and use a large amount of network resources. Additionally, current techniques are typically not scalable and generally inefficient when used in distributed network topologies. For example, when employing Top N algorithm filtering, all data within the filter is forwarded to a central location for grouping, sorting, and processing. In view of the foregoing, it is desirable to provide techniques for measuring KPIs for distributed databases while minimizing impact on system performance and network resources.

SUMMARY

The present invention provides improved techniques for determining KPI(s) (e.g., Top N and/or Bottom N) for a given dimension or a set of dimensions in a distributed network. The subject invention particularly reduces the amount of data that is moved between edge nodes and a central querying node, while at the same time provides best approximations of the KPI using an iterative approach (i.e., two or more queries), which conserves valuable processing and bandwidth.

According to one embodiment of the invention, a central node in the distributed communication network sends a query indicating at least one key performance indicator (KPI) (e.g., a device availability, a latency, a packet loss, a network interface bandwidth, a time period, a network link volume, a device health, etc.) and a first KPI filter criterion (e.g., Top N/Bottom N, etc.) to one or more edge nodes. Notably, the query causes each edge node to cache subscriber data (e.g., node data, dimension data such as node types, handsets, etc.) from each subscriber having a KPI value corresponding to the KPI, and return, according to the first KPI filter criterion (N values), the subscriber data from the cached subscriber data to the central node. The central node aggregates the subscriber data returned from each edge node according to each subscriber and the corresponding KPI value to yield an aggregated initial subscriber dataset. The central node further sends a subsequent query indicating at least one subscriber from the aggregated initial subscriber dataset (e.g., the subscriber is within a bottom L/2 subscribers of the aggregated initial subscriber) that was not returned by a corresponding edge node. This subsequent query causes the corresponding edge node to return subsequent subscriber data for the indicated subscriber from the cached subscriber data to the central node. The central node also aggregates the subsequent subscriber data with the initial subscriber dataset to yield a final subscriber dataset that indicates a total KPI value for each subscriber and returns the final subscriber dataset to a user.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

The present invention provides bandwidth efficient and scalable filtering techniques (e.g., for KPIs, etc.), which are particularly adapted for distributed network architectures. The present invention achieves such efficient and scalable filtering techniques by truncating larger queries (e.g., filter requests) into smaller, more efficient queries (e.g., as between a central node and an edge node), aggregating initial results and, based on the initial results, obtaining additional data using specifically targeted queries. Such techniques overcome prior bandwidth intensive processes that employ a single algorithm (e.g., a Top N algorithm).

Figure 1:
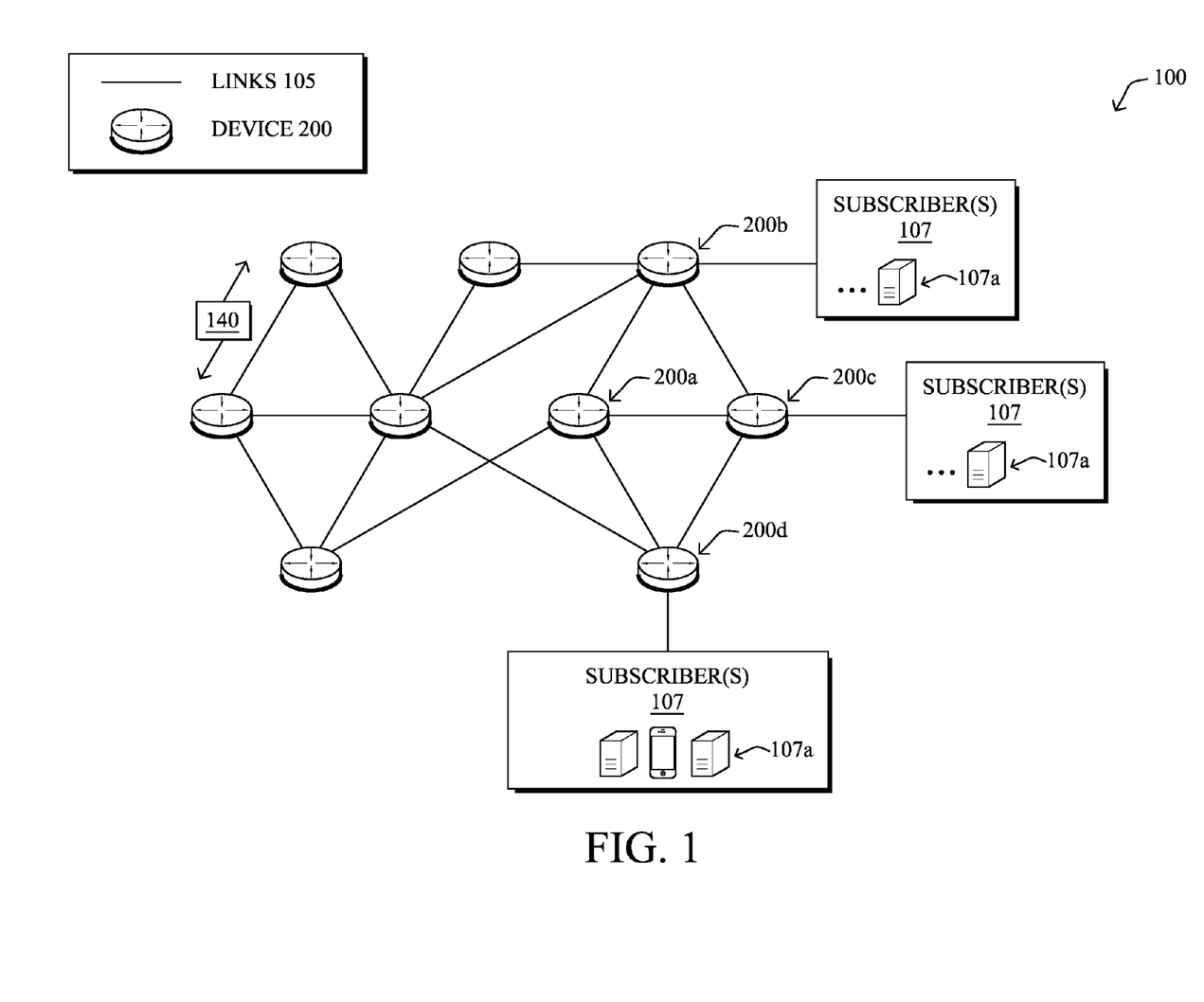
FIG. 1 illustrates an example distributed communication network.

Referring now to the drawings, FIG. 1 provides a schematic diagram of an example distributed communication network 100. With respect to network 100, it is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Communication network 100 illustratively comprises nodes/devices 200 interconnected by various methods of communication. For instance, the links 105 may be wired links or may comprise a wireless communication medium, where certain nodes 200, such as, e.g., routers, servers, switches, sensors, computers, etc., may be in communication with other nodes 200, e.g., based on distance, signal strength, current operational status, location, etc. Those skilled in the art will understand that any number of nodes, devices, links, etc. may be used in the communication network, and that the view shown herein is for simplicity.

Further, certain nodes (e.g., labeled as 200*b*, 200*c*, 200*d*), each have respective subscribers 107, which may comprise any number of other network devices/nodes. As discussed below, one subscriber 107*a* is connected to one or more nodes —200*b*, 200*c*, and 200*d*. Also, while the embodiments are shown herein with reference to one or more edge nodes (e.g., nodes connected to subscribers, etc.) and central nodes (e.g., nodes connected to edge nodes, etc.), the description herein is not so limited, and may be applied to networks that have any number of additional links among a plurality of other nodes.

Figure 2:
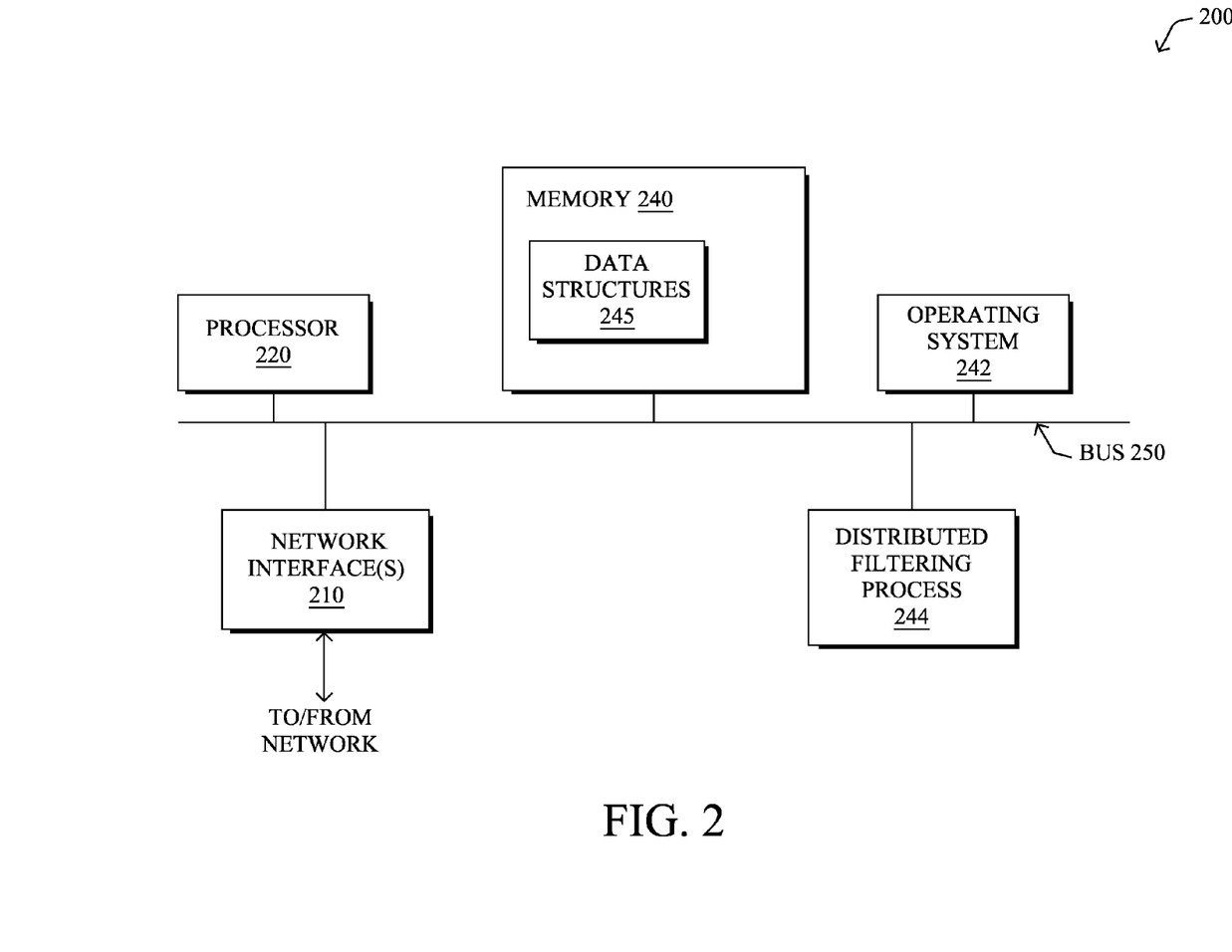
FIG. 2 illustrates an example network device/node.

FIG. 2 is a schematic block diagram of an example node/device 200 that may be used with one or more embodiments described herein, e.g., as a central node (200*a*) or edge node (e.g., 200*b*, 200*c*, 200*d*, etc.) in the network 100. The device 200 comprises one or more network interfaces 210, at least one processor 220 (e.g., a microcontroller), and a memory 240 interconnected by a system bus 250.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, powerline communication (PLC) protocols, etc.

The memory 240 comprises a plurality of storage locations that are addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate data structures 245, such as routes, prefixes, subscriber data (e.g., key performance indicators (KPIs) for subscribers, various dimensions including mobile phone model/make, nodes, etc.).

An operating system 242, portions of which are typically resident in memory 240 and executed by the processor, functionally organizes the device 200 by, inter alia, invoking operations in support of software processes and/or services executing on the device. These software processes and/or services may comprise distributed filtering process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the distributed filtering process 244, which may contain computer executable instructions executed by the processor 220 (or independent processor of network interfaces 210) to perform functions relating to the techniques described herein.

As noted above, the present invention provides bandwidth efficient and scalable filtering techniques (e.g., for KPIs, etc.) by truncating larger filter requests into smaller, more efficient queries, aggregating initial results and, based on the initial results, obtaining additional data using specifically targeted queries. Notably, such techniques are particularly suited for analysis of Key Performance Indicators (KPIs). Although there is no one definitive KPI definition or standard for determining which values are KPIs, the telecommunications industry has evolved over time to create a set of common values (e.g., Best Practices) that should be monitored and include, for example, device availability, latency and packet loss, network interface statistics, network link statistics, device health (e.g., memory, temperature, etc.), device bandwidth usage, and the like.

FIGS. 3-6, collectively, illustrate the distributed filtering techniques (e.g., distributed filtering process 244 of FIG. 2) for the present invention. For purposes of discussion herein, the distributed filtering technique includes a Top N algorithm to determine Top N subscribers (and/or other dimensions such as nodes, node types, handsets, etc.) in a distributed network for a respective KPI value. However, it should be appreciated by those skilled in the art that any type of filtering algorithm can be used, and that the Top N algorithm is used for exemplary purposes only.

Figure 3:
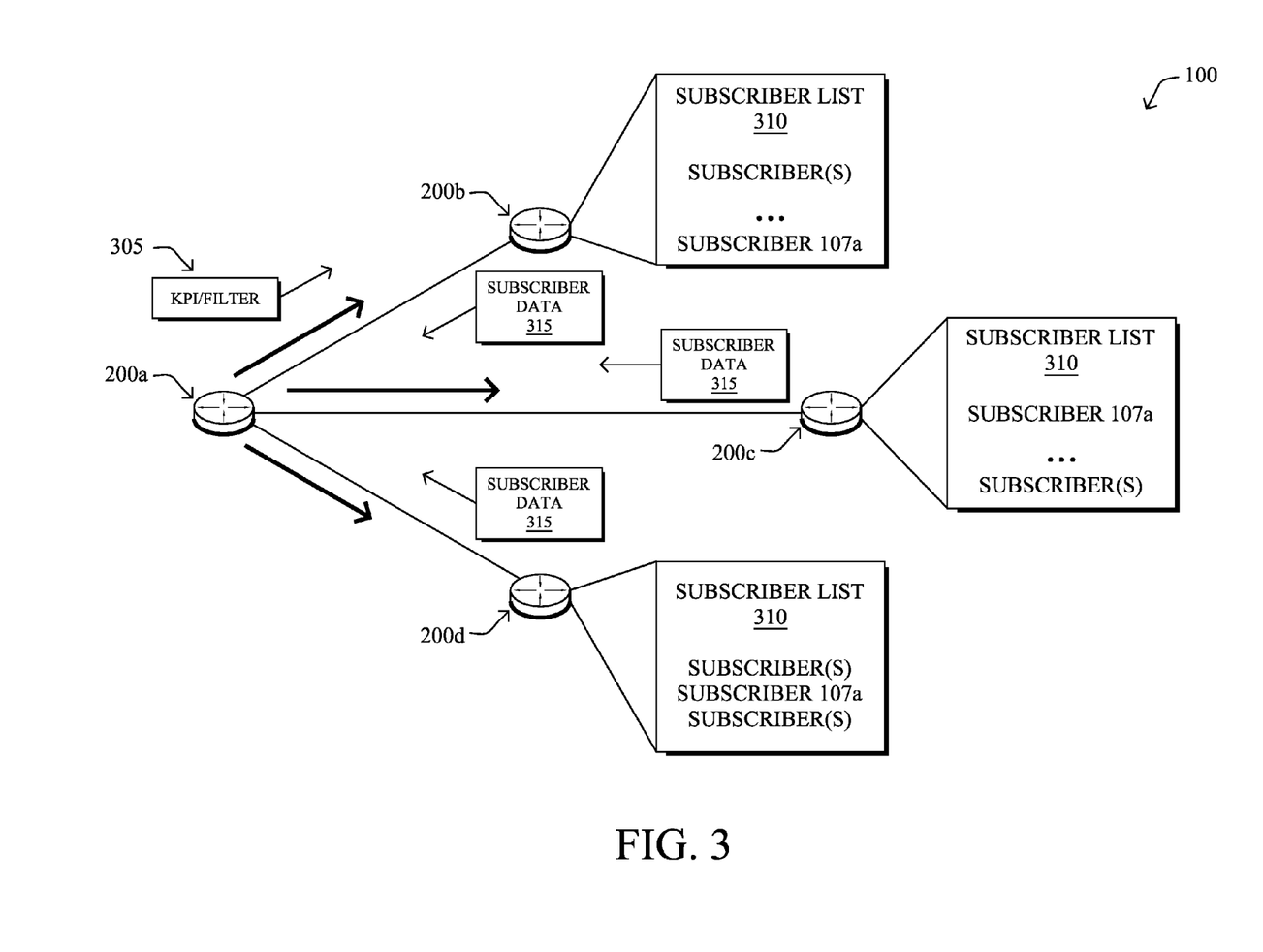
FIG. 3 illustrates an example view of the distributed communication network showing a transfer of subscriber data to central node.

Referring now to FIG. 3, an example view of the distributed communication network is provided and particularly shows a transfer of subscriber data to a central node. As shown in FIG. 3, central node 200*a*, sends an initial query 305 to one or more edge nodes—here, node 200*b*, 200*c* and 200*d*. The initial query 305, in certain embodiments, is a vector having various dimensions that, for example, indicates at least one KPI as well as KPI filter criteria (e.g., return the Top N subscribers for the KPI, etc.). The initial query 305 is received by each of the edge nodes 200*b*, 200*c* and 200*d*, and causes each edge node to cache subscriber data (e.g., subscriber ID, KPI value(s), desired dimensions, etc.) associated with the KPI of the initial query 305. As shown, each edge node caches subscriber data associated with the requested KPI from the initial query 305 in a respective subscriber dataset 310. It is noted, this initially cached data (i.e., subscriber dataset 310) is locally stored by each edge node and is quickly accessed by the edge node in response to subsequent queries, which is discussed below (with reference to FIG. 5). Additionally, in response to initial query 305, each of edge nodes 200b, 200c and 200d preferably sends respective subscriber data 315 that satisfies the initial KPI filter criteria of query 305—subscriber data from the cached data of each edge node that satisfies the Top N subscribers for the KPI.

Figure 4:
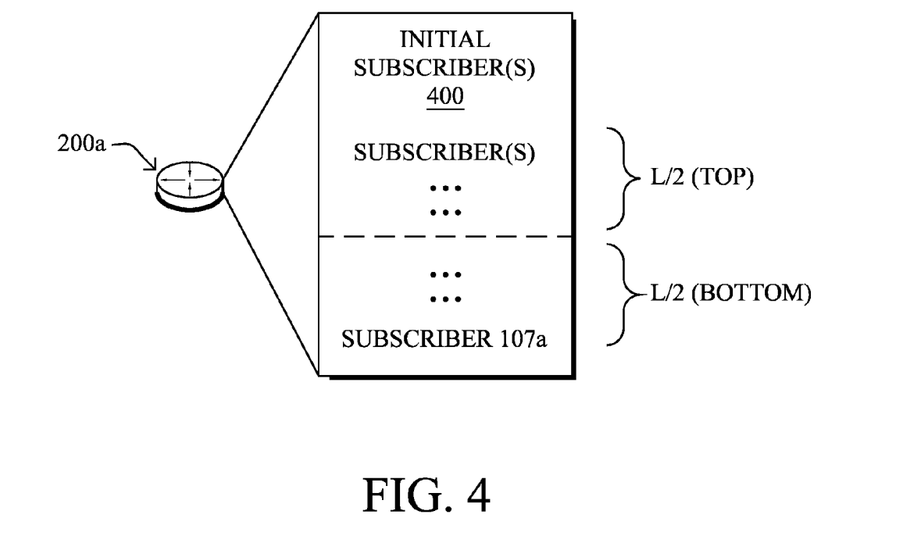
FIG. 4 illustrates an example view of the central node of FIG. 3 aggregating the subscriber data into an initial subscriber list "L"

FIG. 4 illustrates an example view of the central node 200a aggregating the subscriber data from each edge node 200b, 200c, and 200d into an initial subscriber dataset 400 or list "L". Once central node 200a receives the subscriber data from each of the edge nodes, the central node 200a aggregates the subscriber data according to each subscriber and a summation of respective KPI values. Central node 200a also sorts the subscriber data according to the magnitude of the KPI value (e.g., a higher KPI value being close to a "TOP" of the initial subscriber dataset 400). For example, as discussed above with respect to FIG. 1, subscribers 107 can, for example, subscribe to multiple nodes. As shown, subscriber 107a is a subscriber of each edge node 200b, 200c, and 200d. For certain edge nodes (i.e., edge nodes 200c and 200d) subscriber 107a has associated subscriber data that satisfies the initial query 305, which is returned to central node 200a and is aggregated.

As shown in the initial subscriber dataset 400, subscriber 107a falls within the bottom half (L/2) of subscribers. However, subscriber data (e.g., KPI value) for subscriber 107a was not returned by edge node 200b since subscriber 107a did not fall within the Top N subscribers for the node. Accordingly, the initial subscriber list does not fully represent the KPI value for subscriber 107a. Put differently, certain subscribers may fall within a Top N for a KPI value in a distributed network, but may be overlooked since, for each edge node, the subscriber (and associated subscriber data) falls outside the initial query 305. Thus, in order to capture such overlooked subscribers, a second or subsequent query is generated and sent from the central node to specific edge nodes, illustrated in FIG. 5.

Figure 5:
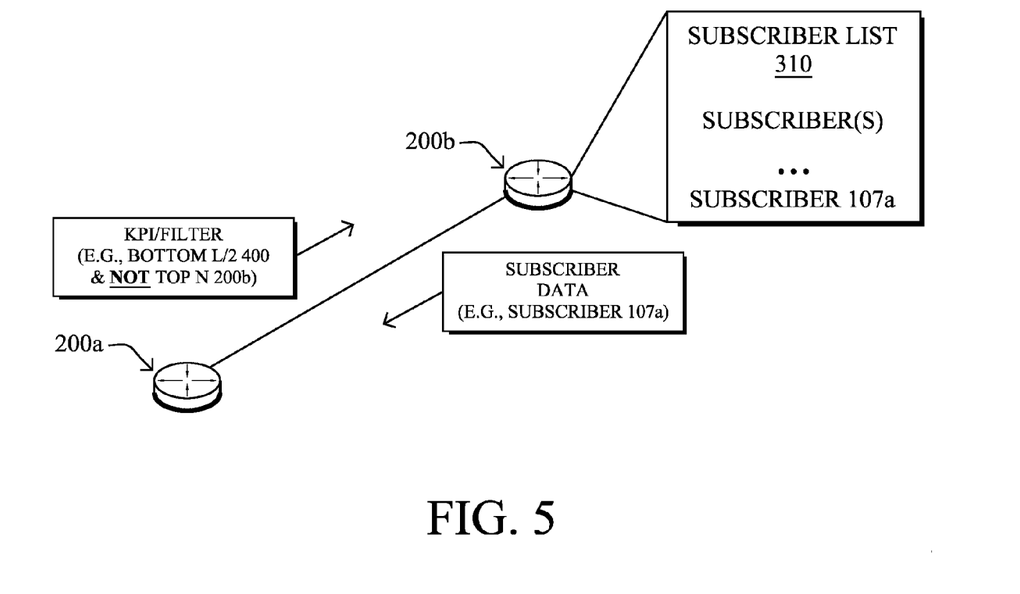
FIG. 5 illustrates a partial view of the example distributed communication network provided in FIG. 3, showing a subsequent transfer of subscriber data to the central node.

FIG. 5 illustrates a partial view of the example distributed communication network provided in FIG. 3, showing a transfer of subscriber data from edge node 200b to the central node 200a according to a subsequent query 505. As discussed above, in order to capture overlooked subscribers (e.g., subscribers for multiple nodes that are not within a Top N for each respective node), a second or subsequent query 505 is generated. Subsequent query 505 is particularly targeted for each edge node and requests (for each edge node) subscriber data (e.g., KPI values) for subscribers within the Bottom (L/2) of the initial subscriber dataset 400 and subscriber data not previously returned by the respective edge node, but within the cached subscriber list 310 (e.g., subscriber data not returned by the initial Top N query 305). As shown, edge node 200b receives the subsequent query 505 and, in response to the subsequent query 505, sends the requested subscriber data—here subscriber data for subscriber 107a—to central node 200a. The subsequent query 505 conserves valuable bandwidth by using a targeted approach that prevents duplicate data from an edge node from being transmitted in the network. Additionally, the subsequent query 505 efficiently requests data from edge nodes since it requests locally cached data from particular edge nodes (which cache is set by the initial query 305).

Figure 6:
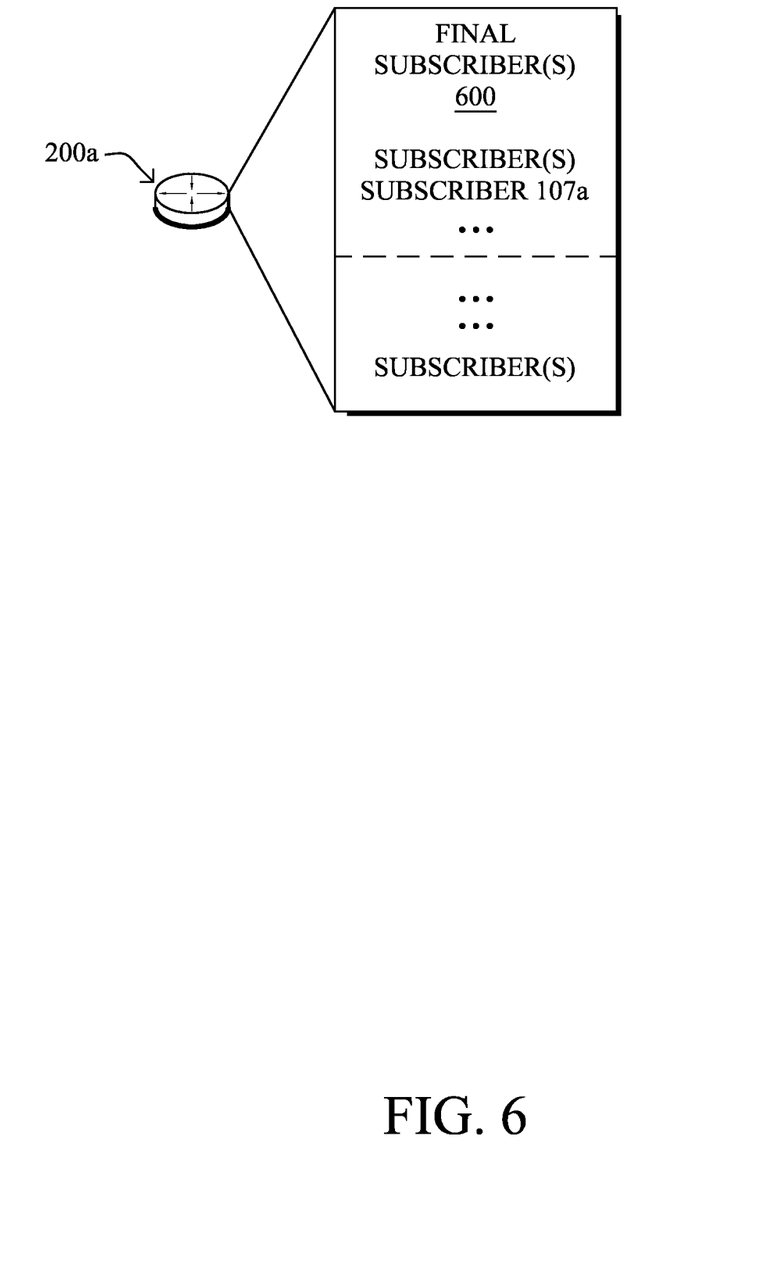
FIG. 6 illustrates an example view of the central node of FIG. 3 aggregating the subscriber data into a final subscriber list.

Central node 200a receives the additional or subsequent subscriber data, responsive to the subsequent query 505 and, as shown in FIG. 6, aggregates the subsequent subscriber data into a final subscriber dataset 600 that indicates a total KPI value for each subscriber. Notably, the aggregated subscriber data for subscriber 107a causes subscriber 107a (for the respective KPI value) to falls within the Top (L/2) of the final subscriber dataset. In this fashion, subscriber data responsive to the subsequent query accurately captures otherwise overlooked subscribers returned by Top N algorithms.

Notably, in certain other embodiments, distribution statistics can be collected for each KPI for a fixed set of dimensions over a defined time period. Using these distribution statistics, subscriber data from the initial subscriber dataset 400 can be aggressively truncated to create even more specific or targeted subsequent queries due to a higher level of confidence in the distribution of the KPI for the fixed set of dimensions.

Figure 7:
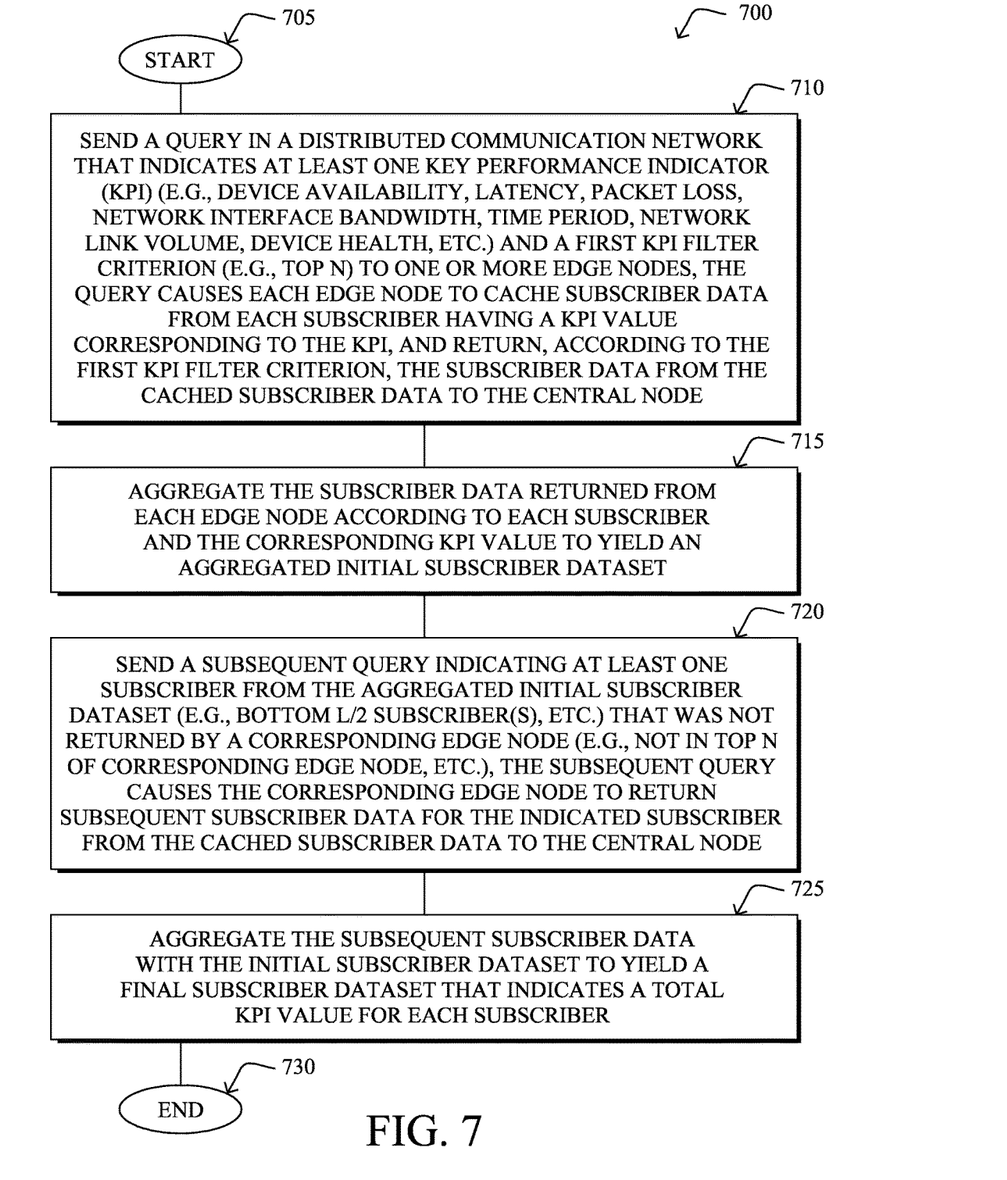
FIG. 7 illustrates an example simplified procedure for efficiently filtering and processing subscriber data in a distributed communication network, particularly from the perspective of the central node.

FIG. 7 illustrates an example simplified procedure 700 for efficiently filtering and processing subscriber data in a distributed communication network, particularly from the perspective of the central node 200a, in accordance with one or more embodiments described herein.

Procedure 700 begins at start 705 and continues on to step 710, where, as discussed above, a central node sends a query in a distributed communication network that indicates at least one key performance indicator (KPI) (e.g., device availability, latency, packet loss, network interface bandwidth, time period, network link volume, device health, etc.) and a first KPI filter criterion (e.g., Top N) to one or more edge nodes. The query is received by the edge nodes and causes each edge node to cache subscriber data from each subscriber having a KPI value corresponding to the KPI, and return, according to the first KPI filter criterion, the subscriber data from the cached subscriber data to the central node. As discussed above, the first KPI filter criterion can include, but is not limited to a Top N criterion whereby the edge nodes return the Top N subscribers for the KPI.

The central node receives the subscriber data returned from each edge node in step 715, and aggregates the subscriber data returned from each edge node according to each subscriber and the corresponding KPI value to yield an aggregated initial subscriber dataset. For example, as discussed above, the central node 200a aggregates the initial subscriber data into the initial subscriber dataset 400.

As discussed above, one or more subscribers may be overlooked by the first query since such subscribers may subscribe to numerous other nodes and, for each other node, the subscribers can fall outside the initial filter criterion (e.g., Top N for each node). Accordingly, the central node, in step 720, sends a subsequent query indicating at least one subscriber from the aggregated initial subscriber dataset (e.g., within a Bottom L/2 of the initial subscriber dataset 400) and was not returned by a corresponding edge node (e.g., not in Top N of corresponding edge node, etc.). This second, targeted query causes corresponding edge nodes to return subsequent subscriber data for the indicated subscriber from the cached subscriber data to the central node.

The central node receives the subsequent subscriber data and, in step 725, aggregates the subsequent subscriber data with the initial subscriber dataset to yield a final subscriber dataset that indicates a total KPI value for each subscriber. In this fashion, otherwise overlooked subscribers (e.g., subscriber 107a, discussed above) are accurately captured in the final dataset.

Subsequently, procedure 700 may end in step 730, or may continue to step 705 where the central node sends a query indicating a KPI and a KPI filter criterion, discussed above. Although procedure 700 is discussed with respect to a query for a KPI, it is appreciated by those skilled in the art that any number of queries may be used, and any number of KPI dimensions can be specified without departing from the spirit scope of the invention.

Further, it should be noted that certain steps within procedures 700 may be optional and the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for bandwidth efficient processing and filtering in distributed networks using at least two queries from a central node. In particular, the techniques herein significantly reduce the bandwidth used by initially causing edge nodes to cache a list of subscribers for a KPI and subsequently sending targeted queries (that limit duplicate data) to particular edge nodes. For example, as discussed above, the techniques described reduce the amount of data that is moved between edge nodes and a central querying node, while at the same time provide best approximation of a particular KPI using an iterative approach (i.e., two or more queries).

While there have been shown and described illustrative embodiments that provide for determining Top N results for a specific KPI in a distributed network, it is to be understood that various other adaptations and modifications may be made within the spirit and scope of the embodiments herein. For example, the embodiments in their broader sense are not limited to Top N results, and may, in fact, be used with other filtering algorithms (e.g., Bottom N results, portions of Top N results for specific KPI(s) or other fixed dimensions, etc.). Further, while the views shown and described illustrate a single central node communicating directly with corresponding edge nodes, it is to be appreciated a distributed system can include (or exclude) any other nodes therebetween.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for filtering data across distributed databases in a communication network, the method comprising:
   sending, via a central node, a query indicating at least one key performance indicator (KPI) and a first KPI filter criterion to one or more edge nodes, the query causes each edge node to cache subscriber data from each subscriber having a KPI value corresponding to the KPI, and return, according to the first KPI filter criterion, the subscriber data from the cached subscriber data to the central node wherein the KPI filter criterion includes a top N criterion for the KPI;
   aggregating, via the central node, the subscriber data returned from each edge node according to each subscriber and the corresponding KPI value to yield an aggregated initial subscriber dataset;
   sending, via the central node, a subsequent query indicating at least one subscriber from the aggregated initial subscriber dataset that was not returned by a corresponding edge node, the subsequent query causes the corresponding edge node to return subsequent subscriber data for the indicated subscriber from the cached subscriber data to the central node wherein the subsequent query indicating at least one subscriber from the aggregated initial subscriber dataset that was not returned by the corresponding edge node indicates at least one subscriber from the aggregated initial subscriber data set within a bottom L/2 subscribers of the aggregated initial subscriber dataset; and
   aggregating, via the central node, the subsequent subscriber data with the initial subscriber dataset to yield a final subscriber dataset that indicates a total KPI value for each subscriber.

2. The method of claim 1, wherein the KPI includes at least one of a device availability, a latency, a packet loss, a network interface bandwidth, a time period, a network link volume and a device health.

3. The method of claim 1, further comprising:
   returning the final subscriber dataset to a user.

4. The method of claim 1, wherein aggregating, via the central node, the subscriber data returned from each edge node, further comprises:
   sorting the subscriber data according to each subscriber and each corresponding KPI value.

5. A device in a distributed communication network, comprising:
   one or more network interfaces adapted to communicate in the distributed communication network;
   a processor adapted to execute one or more processes; and
   a memory configured to store a process executable by the processor, the process when executed operable to:
      send a query indicating at least one key performance indicator (KPI) and a first KPI filter criterion to one or more edge nodes, the query causes each edge node to cache subscriber data from each subscriber having a KPI value corresponding to the KPI, and return, according to the first KPI filter criterion, the subscriber data from the cached subscriber data to the central node;
      aggregate the subscriber data returned from each edge node according to each subscriber and the corresponding KPI value to yield an aggregated initial subscriber dataset;
      send a subsequent query indicating at least one subscriber from the aggregated initial subscriber dataset that was not returned by a corresponding edge node, the subsequent query causes the corresponding edge node to return subsequent subscriber data for the indicated subscriber from the cached subscriber data to the central node wherein the subsequent query indicating at least one subscriber from the aggregated initial subscriber dataset that was not returned by the corresponding edge node indicates at least one subscriber from the aggregated initial subscriber data set within a bottom L/2 subscribers of the aggregated initial subscriber dataset; and aggregate the subsequent subscriber data with the initial subscriber dataset to yield a final subscriber dataset that indicates a total KPI value for each subscriber.

6. The device of claim 5, wherein the first KPI filter criterion includes a top N criterion for the KPI.

7. The device of claim 5, wherein the KPI includes at least one of a device availability, a latency, a packet loss, a network interface bandwidth, a time period, a network link volume and a device health.

8. The device of claim 5, wherein the process, when executed, is further operable to:
return the final subscriber dataset to a user.

9. The device of claim 5, wherein the process, when executed to aggregate the subscriber data returned from each edge node, is further operable to:
sort the subscriber data according to each subscriber and each corresponding KPI value.

10. A tangible, non-transitory, computer-readable media having software encoded thereon, the software, when executed by a processor, operable to:
send a query indicating at least one key performance indicator (KPI) and a first KPI filter criterion to one or more edge nodes, the query causes each edge node to cache subscriber data from each subscriber having a KPI value corresponding to the KPI, and return, according to the first KPI filter criterion, the subscriber data from the cached subscriber data to the central node;
aggregate the subscriber data returned from each edge node according to each subscriber and the corresponding KPI value to yield an aggregated initial subscriber dataset;
send a subsequent query indicating at least one subscriber from the aggregated initial subscriber dataset that was not returned by a corresponding edge node, the subsequent query causes the corresponding edge node to return subsequent subscriber data for the indicated subscriber from the cached subscriber data to the central node wherein the subsequent query indicating at least one subscriber from the aggregated initial subscriber dataset that was not returned by the corresponding edge node indicates at least one subscriber from the aggregated initial subscriber data set within a bottom N/2 subscribers of the aggregated initial subscriber dataset; and
aggregate the subsequent subscriber data with the initial subscriber dataset to yield a final subscriber dataset that indicates a total KPI value for each subscriber.

11. The computer-readable media of claim 10, wherein the first KPI filter criterion includes a top N criterion for the KPI.

12. The computer-readable media of claim 10, wherein the KPI includes at least one of a device availability, a latency, a packet loss, a network interface bandwidth, a time period, a network link volume and a device health.

13. The computer-readable media of claim 10, wherein the process, when executed by the processor, is further operable to:
return the final subscriber dataset to a user.

14. The device of claim 10, wherein the process, when executed by the processor to aggregate the subscriber data returned from each edge node, is further operable to: sort the subscriber data according to each subscriber and each corresponding KPI value.

* * * * *